(No Model.) 2 Sheets—Sheet 2.
A. S. PARKER.
CORN PLANTER.
No. 493,781. Patented Mar. 21, 1893.
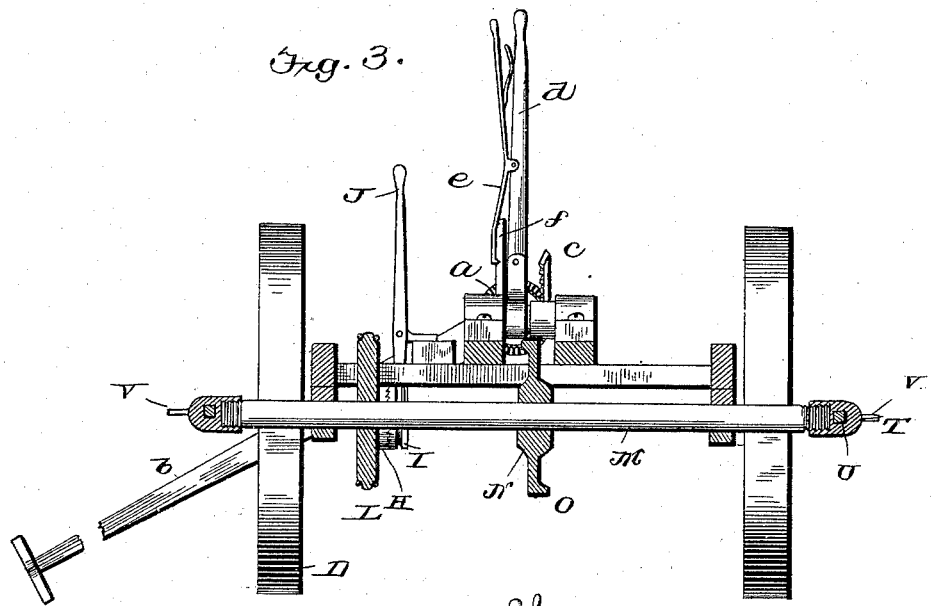
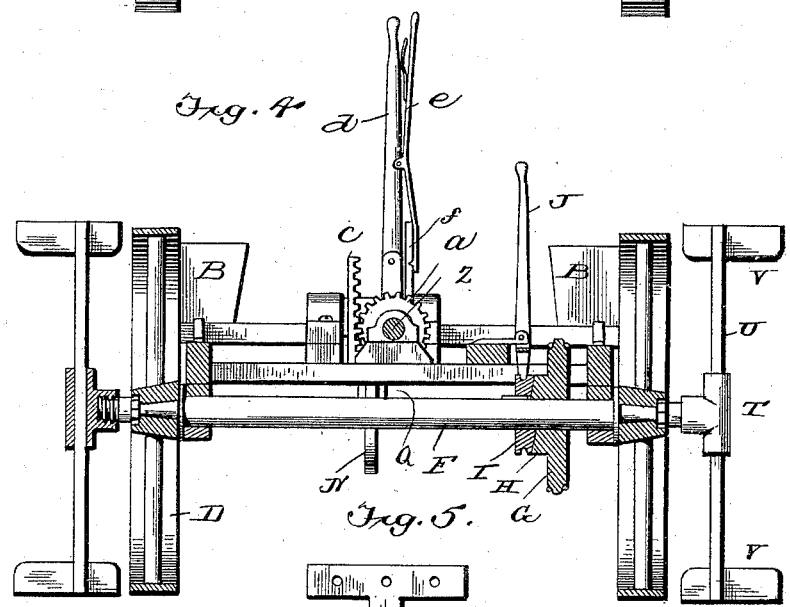
Witnesses
John Jaurre
A S Bishop
Inventor
Ananias S. Parker
by R. W. Bishop
Attorney
THE NORRIS PETERS CO., PHOTO-LITHO., WASHINGTON, D. C.

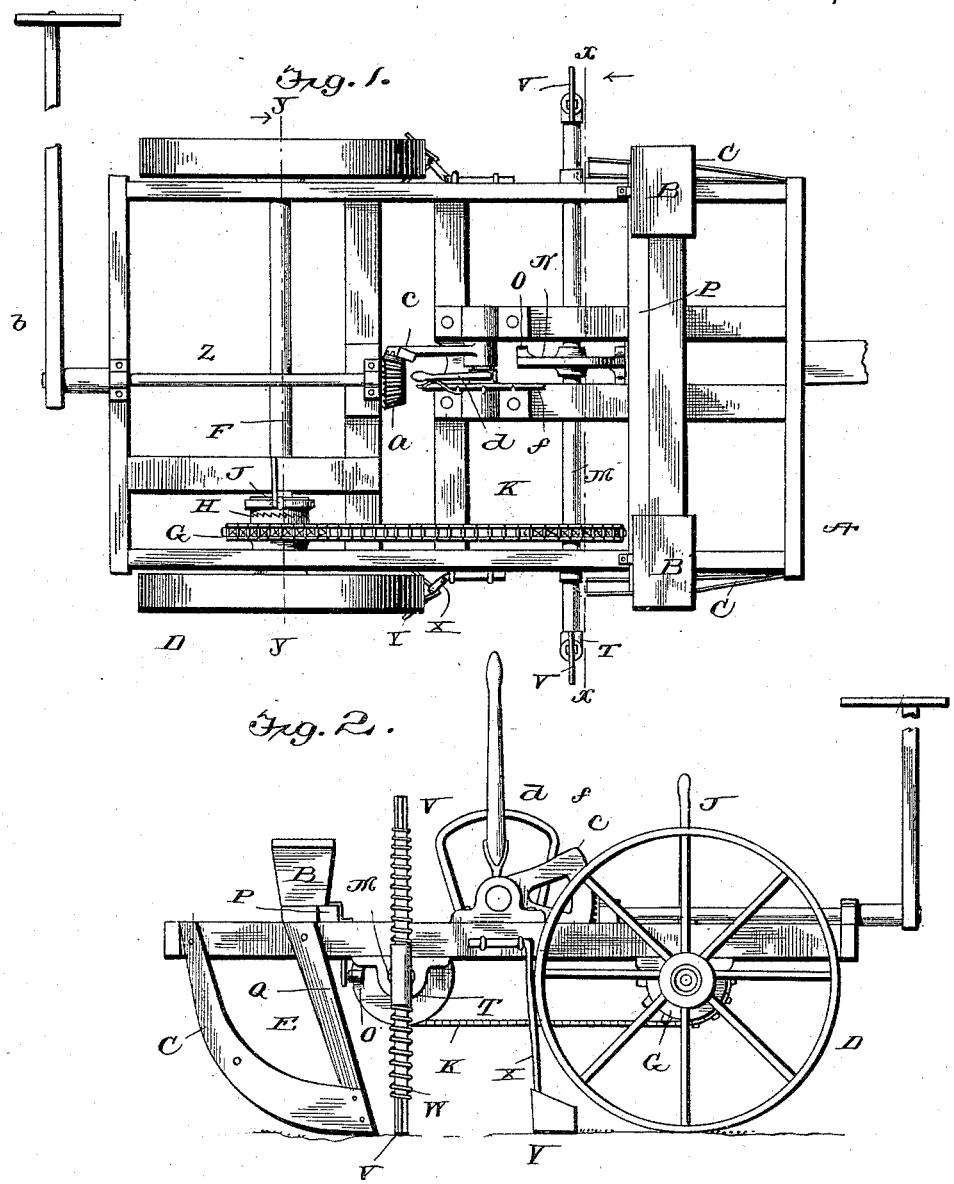

UNITED STATES PATENT OFFICE.

ANANIAS S. PARKER, OF MOLINE, ILLINOIS.

CORN-PLANTER.

SPECIFICATION forming part of Letters Patent No. 493,781, dated March 21, 1893.

Application filed November 25, 1892. Serial No. 453,020. (No model.)

*To all whom it may concern:*

Be it known that I, ANANIAS S. PARKER, a citizen of the United States, residing at Moline, in the county of Rock Island and State of Illinois, have invented certain new and useful Improvements in Corn-Planters; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in corn planters and it consists in certain novel features hereinafter described and claimed.

In the annexed drawings, Figure 1 is a plan view of my improved corn planter. Fig. 2 is a side elevation of the same. Fig. 3 is a transverse section on the line $x$—$x$ of Fig. 1 looking in the direction of the arrow. Fig. 4 is a transverse section on the line $y$—$y$ of Fig. 1 looking in the direction of the arrow and Fig. 5 is a detail view.

The main frame A is an open rectangle consisting of suitable longitudinal and transverse timbers or bars and the seed boxes B are secured upon the frame near the front end of the same. The frame is supported by means of the runners or furrow openers C at its front end and the wheel D at its rear end as clearly shown. The runners or furrow openers have their upper ends secured to the side bars of the frame and their lower ends secured to the lower ends of the seed tubes E so that the rear ends of the runners will be directly in line with the wheel, and the wheels are provided with broad treads so that the loose dirt will be forced over and packed upon the dropped seed. The wheels D are secured rigidly to the axle F which is mounted in suitable bearings on the frame A and has a sprocket wheel G loosely mounted near one end. The said sprocket wheel is provided with a half-clutch H on one side which is adapted to engage the sliding clutch I which is keyed upon the axle and is operated by means of a lever J which is fulcrumed on the frame. When the clutch I is disengaged from the half-clutch H the sprocket wheel G will not be set in motion but when the said clutch I is thrown outward it will lock the sprocket wheel to the axle so as to impart motion thereto. The motion thus imparted to the sprocket wheel will be communicated through a sprocket chain K to a sprocket pinion L which is rigidly secured to a shaft M mounted on the frame near the front end of the same, as shown. At about the center of this shaft I secure a disk N which is provided at diametrical points of its opposite faces with the offsets O having beveled ends as clearly shown. The seed slide P is provided with a depending bracket Q at about its center which bracket has the arms R at its lower end and the anti-friction rollers S mounted on said arms. The disk N plays between the said rollers and as it revolves the projections O will impinge upon the rollers S alternately and thereby reciprocate the seed slide so as to drop the seed as will be readily understood. To the ends of the said shaft M I secure the boxes T in which I loosely mount the marker arms U which are provided with the blades V at their opposite ends and are held to the ground when in contact therewith by the springs W which are coiled around the marker arms between the blades and the boxes T. Should the blades strike a rock or other hard obstruction, the springs will permit the marker arms to yield to the obstruction so as to prevent breakage of any of the parts.

To the sides of the frame A I secure the spring arms X to the lower ends of which I secure the shields or deflectors Y. These shields or deflectors serve to throw to one side all the stones and heavy clods of dirt turned up by the runners or furrow openers while at the same time they permit the fine earth to be forced over into the furrows and packed therein by the wheels.

At about the central line of the main frame, at the rear end of the same, I mount the longitudinal shaft Z which is provided with a pinion $a$, at its front end and has a gage $b$ secured to its rear end. The said gage is adapted to run on the ground at one side of the planter and mark out a straight line across the field to form a guide for the driver on the return trip of the machine. The pinion $a$ meshes with a segmental gear $c$ which is pivotally mounted on the frame and is controlled by a lever $d$ carrying a spring catch $e$ adapted to engage notches in a rack bar $f$ to hold the marker in any position to which it may be adjusted. When the machine has reached the end or side of the field, the lever $d$ is vibrated so that the segmental gear $c$ will impart motion to the pinion $a$ and through the same will swing the gage over to the opposite side of the machine. When it is desired to move the machine from one field to another the lever is secured in a central position and the gage will be thereby held vertically at the rear end of the machine.

In practice, the seed boxes are filled with seed and the machine is then drawn over the ground in the usual manner. As the machine is drawn along the runners or furrow openers will open the ground and form a furrow in which the seed will be planted. When the machine is started the clutch I is thrown outward so as to lock the sprocket wheel to the axle and the shaft M will be consequently rotated and the disk N caused to reciprocate the seed slide to drop the seed. When the end of the field has been reached the clutch is shifted so as to release the sprocket wheel and thereby prevent dropping of the seed while the machine is being turned and after the machine has been turned the gage is reversed and the sprocket wheel again locked to the axle as will be readily understood.

It will be readily seen that I have provided a very simple corn planter by which the seed may be easily, rapidly and efficiently planted and its advantages are thought to be obvious. The spring marker arms are so arranged as to strike and partially enter the ground at the same time that the seed enters the furrow and thereby positively and accurately mark the position or location of the hills and indicate the cross-rows. The gage can be reversed with a very slight expenditure of force and the operating mechanism can be instantaneously stopped or started as occasion may require. The spring arms X on the sides of the frame will yield slightly to obstructions but at the same time will have sufficient strength to turn the obstruction aside and jolting of the machine and injury to the carrying wheels are thus avoided.

Having thus described my invention, what I claim, and desire to secure by Letters Patent, is—

The improved corn planter herein described and shown and consisting of a main frame, runners supporting the front end of said frame, wheels supporting the rear end of the same, spring arms secured to the sides of the frame and depending therefrom adjacent to and in advance of the wheels, deflectors or shields secured to the lower ends of said spring arms, a rotatable transverse shaft mounted on the frame in advance of the spring arms, boxes secured rigidly to the ends of said shaft beyond the sides of the frame, marker arms loosely mounted in said boxes, blades secured transversely to the ends of said marker arms, springs coiled around said arms between the boxes and the blades, and a reversible gage mounted on the rear portion of the frame, as specified.

In testimony whereof I affix my signature in presence of two witnesses.

ANANIAS S. PARKER.

Witnesses:
R. A. SMITH,
J. B. OAKLEAF.